US000001447H

United States Statutory Invention Registration [19]

[11] Reg. Number: H1447

Linton

[43] Published: Jun. 6, 1995

[54] COATED SILICA SHELLS

[75] Inventor: Howard R. Linton, Nokomis, Fla.

[73] Assignee: E. I. Du Pont de Nemours and Company, Wilmington, Del.

[21] Appl. No.: 979,497

[22] Filed: Nov. 20, 1992

[51] Int. Cl.[6] ..... B32B 15/02; C25D 13/00; B01J 21/08

[52] U.S. Cl. ..... 428/404; 428/403; 204/181.1; 502/242

[58] Field of Search ..... 428/403, 404, 570; 252/518; 502/242; 110/345; 204/181.1

[56] References Cited

U.S. PATENT DOCUMENTS

| | | | |
|---|---|---|---|
| Re. 27,818 | 11/1973 | Werner | 106/300 |
| 2,885,366 | 5/1959 | Iler | 252/313 |
| 3,087,828 | 4/1963 | Linton | 106/291 |
| 4,199,614 | 4/1980 | Ziolo | 430/111 |
| 4,373,013 | 2/1983 | Yoshizumi | 428/570 |
| 4,431,764 | 2/1984 | Yoshizumi | 524/409 |
| 4,452,830 | 6/1984 | Yoshizumi | 427/215 |
| 4,473,621 | 9/1984 | Drylie | 428/576 |
| 4,621,024 | 11/1986 | Wright | 428/404 |
| 4,767,565 | 8/1988 | Demus et al. | 252/299 |
| 4,775,412 | 10/1988 | Nishikura et al. | 75/0.5 |
| 4,880,703 | 11/1989 | Sakamoto et al. | 428/378 |
| 4,917,952 | 4/1990 | Katamoto et al. | 428/403 |
| 4,944,985 | 7/1990 | Alexander | 428/404 |
| 4,966,087 | 10/1990 | Child | 110/345 |
| 5,024,826 | 6/1991 | Linton | 423/335 |
| 5,041,162 | 8/1991 | Brand | 106/446 |
| 5,068,063 | 11/1991 | Tremper, III | 252/518 |
| 5,071,676 | 12/1991 | Jacobson | 427/214 |
| 5,104,583 | 4/1992 | Richardson | 252/518 |
| 5,114,756 | 5/1992 | Mirabeau et al. | 427/379 |
| 5,175,136 | 12/1992 | Felthouse | 502/242 |
| 5,178,736 | 1/1993 | Richardson | 204/181.1 |
| 5,236,737 | 8/1993 | Linton | 252/518 |

FOREIGN PATENT DOCUMENTS

| | | |
|---|---|---|
| 0267535 | 5/1988 | European Pat. Off. . |
| 0310340 | 4/1989 | European Pat. Off. . |
| 0359569 | 3/1990 | European Pat. Off. . |
| 3842330 | 6/1990 | Germany . |
| 56-140028 | 11/1981 | Japan . |
| 59-86637 | 5/1984 | Japan . |
| 60-253112 | 12/1985 | Japan . |
| 63520 | 4/1986 | Japan . |
| 61-264345 | 11/1986 | Japan . |
| 62-18564 | 1/1987 | Japan . |
| 62-216105 | 9/1987 | Japan . |
| 63-20342 | 1/1988 | Japan . |
| 63-34180 | 2/1988 | Japan . |
| 63-200158 | 8/1988 | Japan . |
| 63-215745 | 9/1988 | Japan . |
| 63-265930 | 11/1988 | Japan . |
| 01111727 | 4/1989 | Japan . |
| 0462713 | 2/1992 | Japan . |

OTHER PUBLICATIONS

"Inorganic And Theoretical Chemistry", J. W. Mellon, vol. I (1946).

"Preparation And Properties Of Antimony-Doped $SnO_2$ Films By Thermal Decomposition Of Tin 2-ethylhexanoate", A. Tsunashima et al., pp. 2731-2735.

*Primary Examiner*—Shean Wu

[57] ABSTRACT

The disclosure of the invention relates to a high surface area powder composition in which the individual powder particles comprise silica shells which have been coated with finely distributed surface accessible metals, and to a process for preparing the same. Suitable surface accessible metals comprise one or more of Pd, Pt, Ag, among others.

10 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COATED SILICA SHELLS

FIELD OF THE INVENTION

The present invention relates to a high surface area powder composition in which the individual powder particles comprise silica shells or a skin of silica which have been coated with finely distributed surface accessible metals, and to a process for preparing the same.

BACKGROUND OF THE INVENTION

A process for producing silica shell structures is disclosed in U.S. Pat. No. 5,024,826, which issued on Jun. 18, 1991, the disclosure of which is hereby incorporated by reference.

A process for coating silica shell structures with a layer of antimony-containing tin oxide, which can be employed for producing electroconductive powders, is described in European Patent Application Publication No. 0359569, which published on Mar. 21, 1990; the disclosure of which also is hereby incorporated by reference. Such electroconductive powders are useful in electrically conducting coatings but normally not as primary conductors of electricity.

SUMMARY OF THE INVENTION

The present invention relates to a high surface area coated powder composition. The individual powder particles comprise approximately 0.05 to 15 micron silica shells, e.g., amorphous hydroxylated silica, which have a shell thickness of from about 5 to 50 nm, and a surface area of from about 25 to 350 $m^2/g$. The individual silica shells are coated with about 0.1 to 90% by weight of a finely distributed surface accessible metal containing species. Surface accessible denotes that metal containing species are situated on or about the external surface of the silica shells. Suitable metal containing species comprise one or more members from the group of Pd, Pt, Rh, Ir, Re, In, Au, Ag, Cu, Ni, alloys thereof, among others.

One aspect of the invention comprises a process for obtaining the high surface area coated powder composition. Hollow silica shell, which may have a wide range of configurations, can be prepared by the procedures described in U.S. Pat. No. 5,024,826, which issued on Jun. 18, 1991; the disclosure of which has been incorporated herein by reference. The metal containing species can be deposited on the silica shells by mixing water soluble salts of the desired metal containing species into an aqueous slurry of the shells. A water soluble reducing agent is introduced into the slurry for converting or reducing the salts to a metal containing species, which deposits upon the silica shell. In some cases, it is advantageous to introduce a small amount of a water soluble stannous salt which serves as an initiator for the deposition or reduction process that produces the desired coated powder product.

The average size and shape of individual coated powder particles can be predetermined by selecting silica shells which possess the desired configuration. After conducting the coating or depositing step, a product is recovered from the aqueous slurry by any suitable means such as filtration, vacuum filtration, centrifugation, among others. The recovered product can be washed with water until substantially free from soluble residues, and dried.

In comparison to conventional powders, the product of the present invention has a lower density and higher surface area. For example, when employing the powder product of the invention as a catalyst, high surface area is desirable because catalytic activity typically increases with surface area. As a result of the hollow shell structure, the powders of the invention can also achieve a heretofore unknown economy. For example, when the silica shells are coated with costly metal species such as noble metals, the high surface area reduces the quantity of noble metal which is required for an effective end-use or application of the metal. In other words, the catalytic activity of a given quantity of metal is greater when the metal is used as a coating in comparison to a bulk or solid form of the metal.

DETAILED DESCRIPTION OF THE INVENTION

Figure 1:
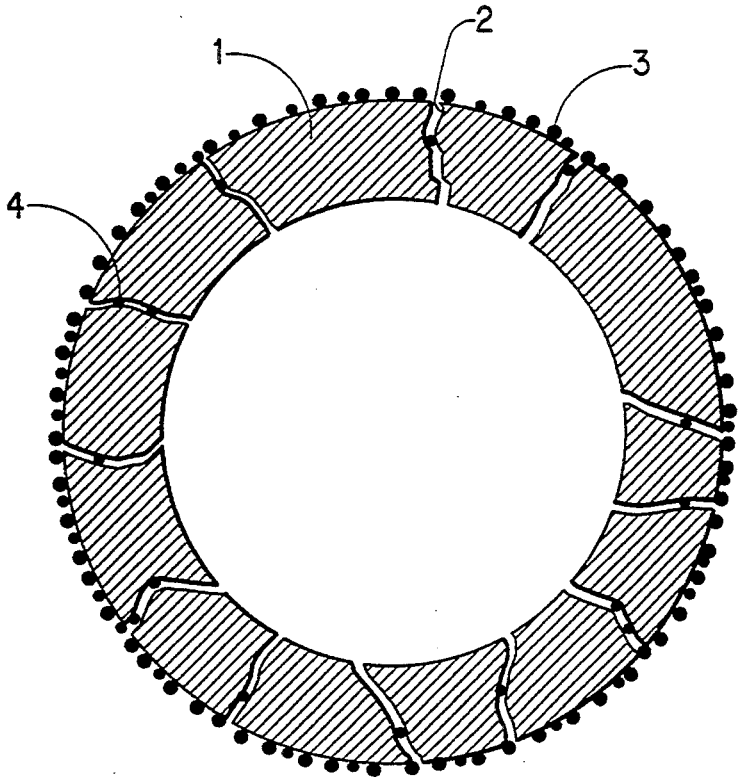
FIG. 1—FIG. 1 is a schematic cross-sectional drawing which shows a hollow silica shell that has a relatively low concentration of metal species deposited on the outer surface of the shell.

The present invention relates to a high surface area powder composition, and a process for obtaining the powder composition. The individual powder particles comprise approximately 0.05 to 15 micron shaped shells of silica, e.g., amorphous hydroxylated silica, which have a shell thickness of from about 10 to 50 nm, and a surface area of from about 25 to 350 $m^2/g$. The shells are coated with about 0.1 to 90% by weight of finely distributed surface accessible metal containing species, e.g., metal crystallites.

Whenever used in the specification and appended claims the terms below are intended to have the following definitions.

"Finely distributed" as used herein refers to the characteristics of the metal containing species. Typically, the average size of the metal containing species, e.g., crystallites, is about 50 to 200 Angstroms. The metal containing species is not necessarily a monolayer or continuous coating; rather the species may comprise an openly distributed network about at least a portion of the surface of the silica shell.

"Metal containing species" as used herein refers to the composition and morphology of the metal which is deposited upon at least a portion of the silica shell. The metal containing species may include one or more metals in a variety of morphologies. Typically, the metal containing species are present as metal crystallites; however, other compounds which are associated with the metal containing species may also be detectable.

"Silica shell" as used herein refers to the characteristics and composition of the shell upon which the metal containing species are deposited. The silica shell is normally hollow, and can be employed in a wide range of sizes, shapes, and shell thicknesses. In some cases, the core material is not removed, and the silica shell is characterized by a skin which surrounds the core material. In such cases, the silica shell or skin, may also include additional components such as alumina, boric oxide, among others. The additional components as well as the core material can be removed by acid extraction.

"Surface accessible" as used herein refers to the metal containing species or metal crystallites which are situated on or about the outer surface of the silica shells. This term does not include metal containing species or metal crystallites which are incorporated within the silica shell structure. Suitable surface accessible metal containing species can comprise one or more members selected from the group of Pd, Pt, Rh, Ir, Re, In, Au, Ag, Cu, Ni, alloys thereof, among others.

Suitable hollow shells, which will support the metal containing species, can prepared by the procedures described in U.S. Pat. No. 5,024,826 which issued on Jun. 18, 1991; the disclosure of which has been incorporated herein by reference. The metal species are deposited on the silica shells by forming an aqueous slurry comprising previously formed silica shells, soluble salts of the desired metals, and a water soluble reducing agent. In some cases, it is advantageous to add a small amount, e.g., about 0.05 to 0.2 mole % grams, of a water soluble stannous salt to the aqueous slurry of silica shells prior to depositing the metal species. The stannous salt can serve as an initiator in the metal deposition or reduction process, and increase the surface area of the resultant product.

The average size and shape of individual powder particles is controlled by the configuration of the silica shells. By appropriately selecting the silica shells upon which the metal containing species are to be deposited, the invention can tailor the characteristics of the powder. The silica shells may be 1) equiaxial particles which have an average diameter of from about 0.05 to 15 microns, 2) acicular particles that have an aspect ratio of from about 2 to 50, and an average diameter of from 0.1 to 0.5 microns, 3) platelike particles which have an aspect ratio of from 10 to 150, and an average diameter of 2 to 15 microns, among others. The surface area of the silica shells typically ranges from about 25 to 350 $m^2/g$, and the shell thickness is from about 5 to 50 nm, more commonly from 10 to 20 nm.

The finely distributed surface accessible metal containing species comprise one or more members selected from a group of Pd, Pt, Rh, Ir, Re, In, Au, Ag, Cu, Ni, alloys thereof, among others. The metal containing species are typically present as crystallites upon the surface of the silica shell. The crystallites normally have an average size in the range of about 50 to 200 Angstroms. The amount of a metal containing species which is present upon the silica shells can range from about 0.1 to 90% by weight of the powder composition. The specific amount of metal can be tailored or modified during the deposition process depending upon the intended end use for the powder composition. For example, increasing the length of the deposition process typically increases the quantity and density of the metal containing species upon the silica shells. In some cases, at least a portion of the finely distributed metal species are located within the pores of the silica shell, e.g, pores which were formed during acid extraction to remove the core material and form a silica shell.

Powders which have a metal content in the range about 0.1 to 10 wt %, and typically about 0.1 to 5 wt %, are useful as catalysts in many chemical processes, e.g., a silica shell which has been coated with a precious metal such as palladium, is effective as a catalyst for directly combining $H_2$ and $O_2$ to yield $H_2O_2$. However, the metal containing species is not necessarily a continuous coating; rather the species may comprise an openly distributed network, e.g., as illustrated in FIG. 1. Referring now to FIG. 1, 1 represents a silica shell with a number of pores 2. The metal containing species comprises crystallites 3, which are generally located upon the outer surface of the shell. While some relatively small metal crystallites may be deposited on pore walls 4, the metal crystallites, including those within the pores, are sufficiently surface accessible in order for the metal crystallites to be effective in certain catalytic end-uses or applications.

Figure 2:
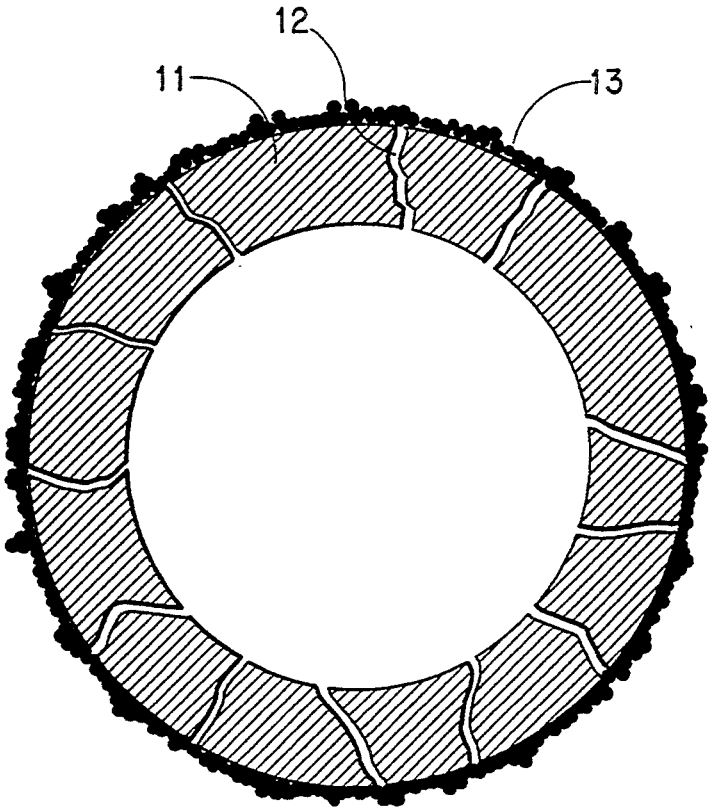
FIG. 2—FIG. 2 is a schematic cross-sectional drawing which shows a hollow silica shell that has a relatively high concentration of metal species deposited on the outer surface of the shell.

Powders, which have a relatively large metal species concentration, in the range of about 10 to 90 wt %, and typically 50 to 90 wt %, are useful as low density electrical conductors, e.g., the powders may be employed as conductors for electronic applications. Such powders generally have a coating of metal containing species which comprises metal crystallites that are closely packed together, e.g., as illustrated in FIG. 2. Referring now to FIG. 2, 10 represents a silica shell with a number of pores 11. Item 12 comprises a layer in which the metal crystallites are normally in contact with one another. When a sufficient quantity of the metal crystallites upon the coated shell adequately contact each other in at least two dimensions, the shell will function as an electrical conductor, i.e., a low density electrical conductor. When a plurality of such shells adequately contact each other, the shells form a powder which can conduct electricity across a relatively large distance, e.g., the powder may be incorporated into a carrier or matrix that forms an electroconductive coating or film.

Figure 3:
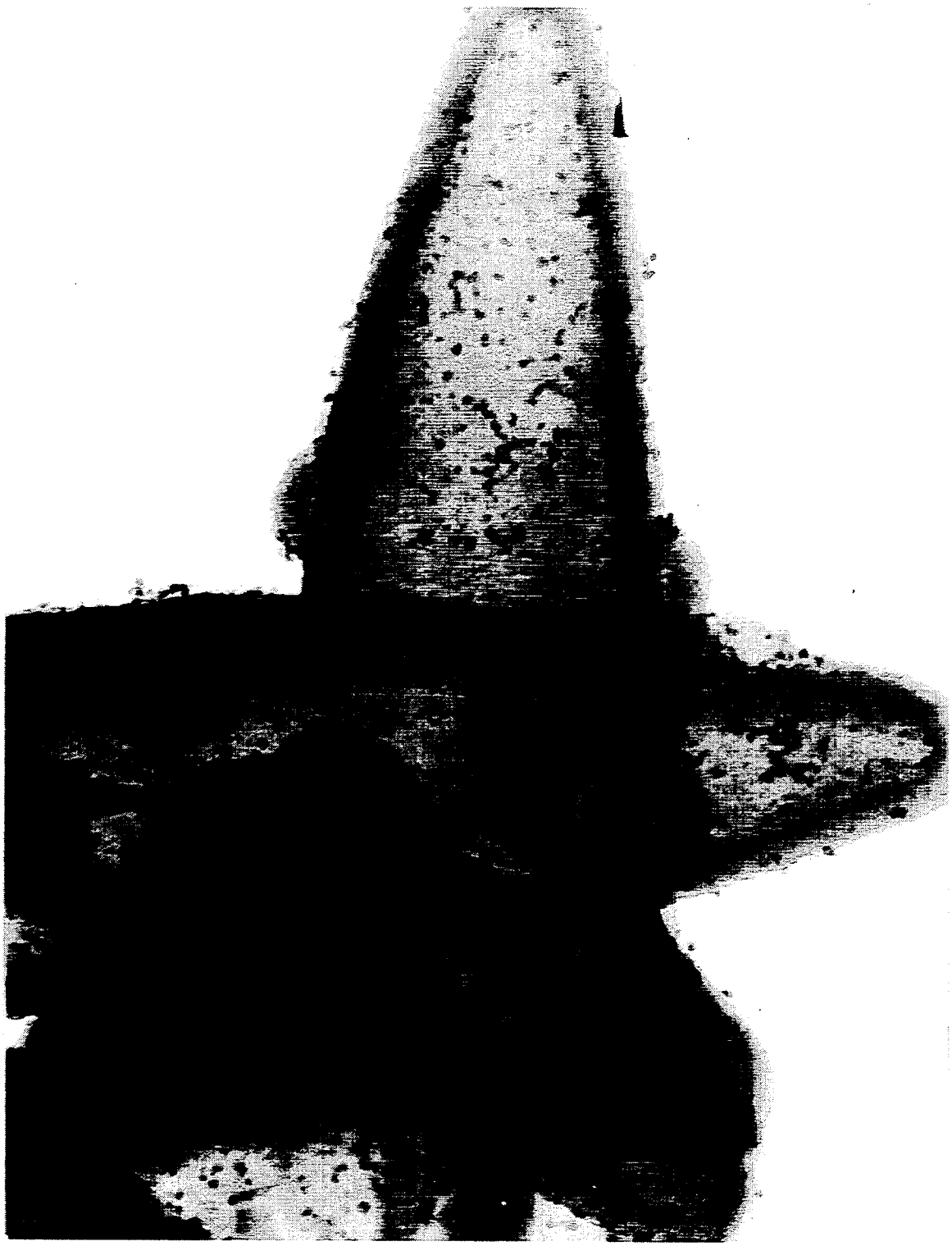
FIG. 3—FIG. 3 is an electron microphotograph, at $3\times105$ magnification, which shows hollow silica shells that are acicular shaped, and include surface accessible Pd metal species deposited on the outer surface of the silica shell.
Figure 4:
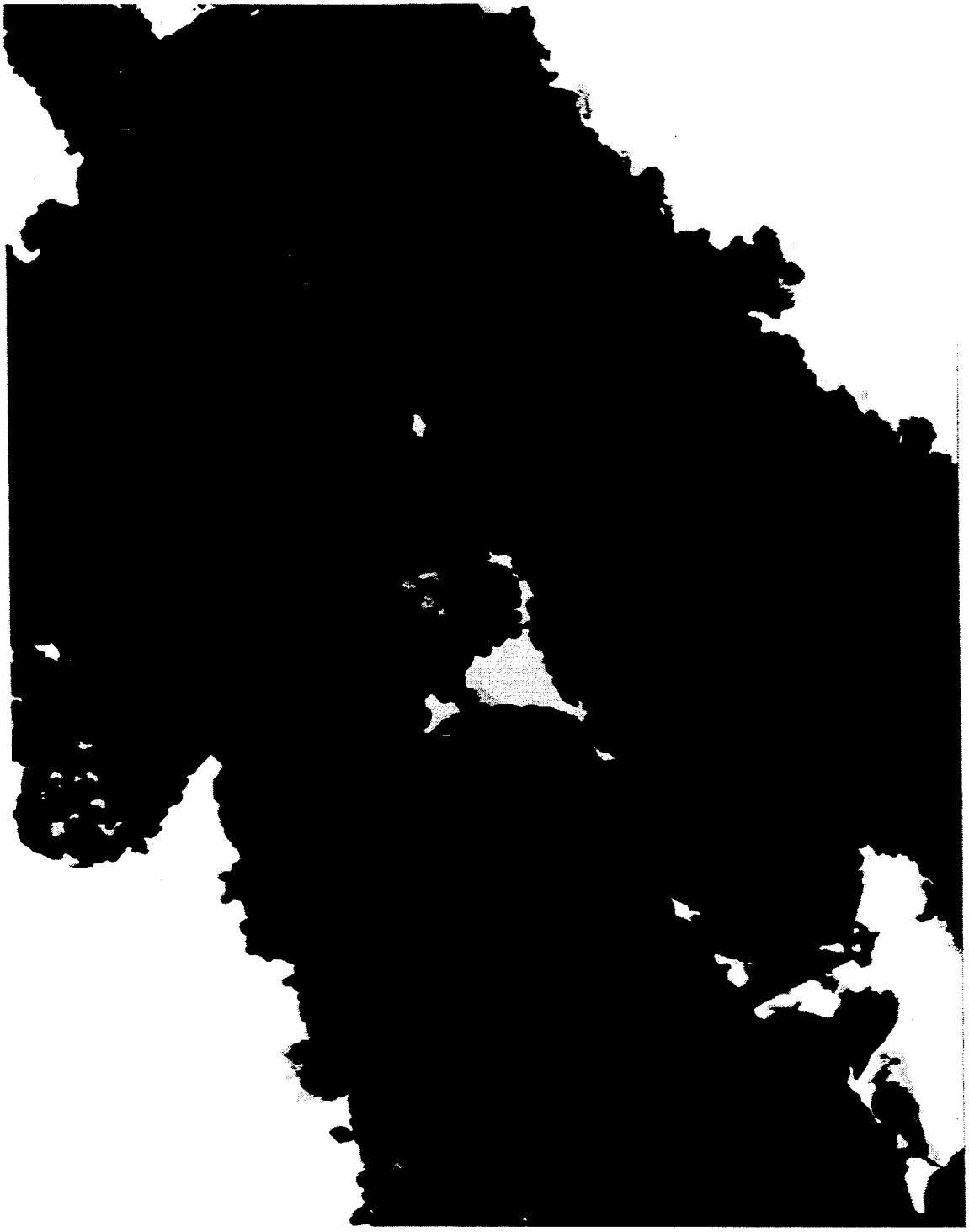
FIG. 4—FIG. 4 is an electron microphotograph, at $3\times104$ magnification, which shows hollow silica shells that are acicular shaped, and include surface accessible Ag metal species deposited on the outer surface of the silica shell.

Referring now to FIGS. 3 and 4, FIGS. 3 and 4 are high magnification ($3\times104$ to $3\times105$ mag.), electron microphotographs which illustrate the distribution of fine Pd metal particles over an acicular shaped silica shell. The relatively dark areas or spots correspond to metal species, i.e., crystallites, upon the silica shell. The silica shells which are shown in FIG. 3 have a relatively low concentration of Pd, whereas the shells that are shown in FIG. 4, have a relatively high concentration of Ag.

The powder composition of the invention can achieve a low density and high surface area form of one or more metals which may be employed as a substitute for solid or bulk metals. The composition is particularly advantageous when used as a catalyst for reactions which are conducted in the liquid or vapor phase. When employing the powder product of the invention as a catalyst, the product's high surface area is desirable because catalytic activity typically increases with surface area. As a result of the hollow shell structure, the powders of the invention can also achieve a heretofore unknown economy by reducing the quantity of metal required for a particular application. For example, when the silica shells are coated with costly metal species such as noble metals, the high surface area reduces the quantity of noble metal which is required for an effective end-use or application of the metal. In other words, the catalytic activity of a given quantity of metal is greater when the metal is employed as a coating upon a silica shell in comparison to a bulk or solid form of the metal. For example, a powder comprising a silver coated silica shell provides a significant economic advantage over bulk or solid silver particles. In certain end uses, e.g., electrical and photographic applications, silver coated silica shells can be used to replace solid silver particles. In another example, indium and alloys thereof are used in conducting films and electronic contacts; substituting indium coated silica shell particles of the invention for solid indium particles can markedly reduce material cost.

A powder composition of the invention can be prepared by a process which generally comprises the steps of:

(a) coating an aqueous slurry of a finely divided inert core material, e.g., calcium carbonate, with active silica, e.g., amorphous hydroxylated silica,
(b) removing the core material, e.g., by acid extraction, thereby obtaining an aqueous slurry of silica shells,
(c) recovering silica shells, washing the silica shells to be substantially free from soluble residues, and then optionally drying the washed shells,
(d) preparing an aqueous slurry of the silica shells and then optionally adding a soluble stannous salt; depositing one or more finely distributed metal containing species on or about the exterior surface of the shells by adding one or more soluble salts of the desired metal, and a water soluble reducing agent, and;
(e) recovering silica shells which have a metal containing species upon at least a portion of the surface thereof, washing the shells to be substantially free from water soluble residues, and drying.

In one aspect of the invention, the core material is not removed, and a silica skin is coated with a finely distributed metal containing species. Should the presence of the core material be desired, the pH, which is used in further processing, should be controlled in order to prevent dissolution of the core. In this aspect of the invention, the silica skin composition may be modified to include additional components. Examples of suitable components comprise one or more members from the group of boric oxide, aluminum oxide, zirconium oxide, among others. For example, when employing a process which deposits silica upon a core material, one or more salts of an additional skin component can provided that are deposited along with the silica. The additional component, which may be present as a complex oxide, mixture or solid solution with silica, becomes a part of the skin. If desired, at least a portion of the additional component and the core material can be removed by exposing such a skin to an appropriate acid. Whether or not the additional component is removed, by employing an effective quantity of an additional component when depositing silica upon the core material, the surface area of the resultant powder can be increased.

While any suitable process can be used for obtaining the silica shells, a suitable process for obtaining the silica shells is described in greater detail in U.S. Pat. No. 5,024,826 which issued on Jun. 18, 1991; the disclosure of which has been incorporated herein by reference.

In another aspect of the invention, the silica shells can be coated with another material before depositing the metal containing species. For example, an intermediate coating which comprises one or more members from the group of alumina, tin oxide, zirconia, among others, can be deposited upon the silica shells. The intermediate coating can be applied by any suitable technique such as hydrolysis of soluble salts, among others. When employing an intermediate coating, it is normally expedient to deposit the coating using salt reduction techniques which are similar to those used to deposit the metal containing species. In some cases, it may be desirable to deposit a plurality of intermediate layers upon the silica shell before, during, and/or after depositing the metal containing species. Such layers can be either chemically similar or distinct. Accordingly, the invention permits tailoring the silica shells to possess a wide range of compositions and/or number of layers.

After obtaining silica shells which have the desired characteristics, a silica shell suspension is prepared, and usually maintained at a temperature of about 40° to 80° C. Normally, the suspension is continuously agitated, for example, by a paddle mixer. Optionally, a water soluble stannous salt, e.g., stannous chloride, can be added to the silica shell suspension, after introducing the metal salts, and before recovering the coated shells. When stannous salt is added, the quantity of this salt ranges from about 0.05 to 0.2 mole % of the silica shells. Without wishing to be bound by any theory or explanation, it is believed that stannous ions, which are adsorbed onto the silica shell surface, function as reduction initiators in the subsequent metal deposition process. It is also believed that in some cases the use of soluble stannous salts may result in a product which has an increased surface area.

Water soluble salts are typically the source of the metal containing species which are deposited upon the silica shells. Any suitable water soluble metal salt such as chlorides, nitrates, among others, can be employed as a source of the metal containing species. The salt solutions are diluted in the range of about 15 g/l to 50 g/l, when the desired metal content of the product is between about 0.1 and 20 wt %. When the desired metal content of the product is between about 20 to 90 wt %, more concentrated salt solutions can be used in the range of about 150g/l to 600g/l. The salt concentration of the solution can be controlled or tailored in order to obtain a coated silica shell product which has the desired quantity of metal containing species deposited thereon. The pH of the salt solutions is normally adjusted, before being added to the shell slurry, to range between about 9 to 11, e.g, by adding a basic material such as $NH_4OH$.

Any suitable reducing agent can be used to practice the invention. A suitable water soluble reducing agent may be selected from one or more members of the group comprising formaldehyde, hydrazine and alkali metal nitrites, phosphites, thiosulfates, among others. In some cases, formaldehyde and/or hydrazine are desirable because these agents do not contain alkali metal cations, which normally are removed, e.g., by washing. An effective quantity of the reducing agent is added to the slurry of silica shells, which contains metal cations that were released when the metal salt dissolved, to substantially completely reduce the metal cations to a metal containing species, e.g., metal crystallites. Typically, an excess quantity of reducing agent, e.g, about 10 to 20% over the stoichiometric requirement, is added to the slurry in order to ensure substantially complete reduction of the metal salt. After adding all the components or reagents into the slurry, the slurry is normally agitated and heated at about 70° C. to 90° C. for at least about half an hour. Usually, the slurry is agitated and heated for about one hour to ensure complete deposition of the metal upon the silica shells.

The coated shells are recovered from the slurry by any suitable means such as filtration, centrifugation, vacuum filtration, among others. The recovered shells are typically washed with water until substantially free from soluble residues, and dried at a temperature which can range from about 110° to 150° C.

While particular emphasis in the above description has been placed upon silica shells which are coated with a metal containing species, the invention is capable of producing a wide range of products. For example, one or more metal containing species may be deposited upon the silica shells either simultaneously and/or as sequential layers. Further, the core material may not be removed, and a product is obtained which possesses a silica skin. In some cases, an intermediate coating is applied upon the silica shells and/or the metal containing species in order to tailor the characteristics of the coated shells. Accordingly, the present invention can be employed to produce a product which has been tailored to satisfy a wide range of end-use applications.

Compositions of the invention and process for obtaining the same are illustrated in greater detail by the following Examples which are not be construed as limiting in any way the scope of the invention. Unless specified otherwise, percentages are in weight percent, and the materials used in these Examples were commercially available.

EXAMPLE 1

This Example describes a process for obtaining palladium coated silica shell which contain about 1% Pd.

About three liters of de-ionized water were added to a 1-gallon Waring Blender jar, and then the pH was increased to about 10.0 by introducing 10% NaOH. To this solution was added about 100 g of a solution, which comprised potassium silicate and had a $SiO_2/K_2O$ molar ratio of about 3.29, and about 26.5 wt % $SiO_2$. Approximately 600 g of $CaCO_3$ powder (known as Albacar H.O. Dry, and supplied by Pfizer Corp.), was added to the solution to form a mixture. The mixture was blended at high speed for about two minutes to form a slurry. The slurry was transferred to a 18 liter agitated polyethylene beaker, and steam heated to about 90° C. in about one half-hour. The pH of the mixture was increased to about 10 by adding 10% NaOH if needed.

Approximately 1,027 g of the potassium silicate stock solution (discussed above), was diluted with 1 liter of water, added to the slurry, and the slurry was continuously agitated for about 5 hours. The pH of the slurry was maintained above about 8.5 by the concurrent addition of hydrochloric acid. Hydrochloric acid solution consisting of about 210 ml. 37% HCl and 28 g $CaCl_2$ diluted with 1 liter of water were used for modifying the pH; final pH of the slurry was about 9.0. The resultant slurry contained solids that comprised calcium carbonate core material which was coated with a hydrated silica skin.

The slurry was digested, i.e., allow to complete any ongoing reactions, at about 90° C. for about one-half hour. The pH of the slurry was then decreased to about 2.0 by adding about 1000 ml of concentrated (37%) HCl. The slurry was digested further at about 90° C. for about half hour to completely dissolve the $CaCO_3$ core material. The resultant hollow silica shells were separated by filtration. The recovered silica shells were washed with deionized water to remove soluble residues, and dried in an air oven at about 110° C. The dry silica shells were examined and determined to have a $SiO_2$ content of almost 100% by weight, and a surface area, as determined by nitrogen absorption of about 115 m 2/ g Approximately 100 g of the dry silica shells were dispersed into about 1 liter of deionized water, which contained about 20 g of dissolved $SnCl_2.2H_2O$. The dispersion was heated to about 80° C., and stirred for one-half hour. The resultant solids were separated by filtration, and washed with deionized water until substantially free from chloride ions. A portion of the solids was sampled and dried to determine the surface area which measured about 73.1 $m^2/g$.

The filter cake, which was obtained by the above filtration step, was dispersed into about 1 liter of deionized water. An aqueous solution comprising $PdCl_2$ (0.015 g Pd/ml) was neutralized with 20% $NH_4OH$ until a pH of about 10 was obtained. About 67 ml of the neutralized solution was slowly added to the filter cake dispersion, which had a been heated to a temperature of about 70° C. The dispersion then became light brown in color. Approximately 10 ml of formaldehyde (30% aqueous solution) was added and stirred into to the brown dispersion every 15 minutes for 75 minutes while maintaining the temperature at about 70° C. The color of the dispersion turned from dark brown to black. The solids in the dispersion were separated by filtration, washed with deionized water to substantially remove soluble residues, and dried in an air oven at about 110° C. The resulting light grey powder, which comprised Pd coated silica shells, contained about 1% Pd upon its surface, and had a nitrogen surface area of about 101.1 m2/ g.

The Pd coated silica shell product was an effective catalyst in amine dehydrogenation. Specifically, when hexylamine vapor was passed over a fixed bed of the shell product at a temperature of about 400° C., the hexlamine vapor was dehydrogenated into hexanenitrile.

The coated shell product of this Example was also found to be effective as a catalyst for obtaining hydrogen peroxide by directly combining hydrogen and oxygen.

EXAMPLE 2

This Example describes a process for preparing palladium coated silica shells which contain about 5% Pd.

Approximately 100 g of silica shell powder, which was prepared substantially in accordance with Example 1, was treated with stannous chloride substantially in the manner described in Example 1. The treated powder was then coated with palladium substantially in the manner described in Example 1 by using about 335 ml of a $PdCl_2$ solution, and adding about 50 ml of formaldehyde (30% aqueous solution), every 15 minutes for about two hours. The resulting black slurry was filtered, washed with deionized water for substantially removing soluble residues, and dried in an air oven at about 110° C. The resultant black powder contained about 5% Pd upon the surface of a silica shell, and had a nitrogen surface area of about 50.9 $m^2/g$.

The product of this Example has utility as a dehydrogenation catalyst for the production of naphthalene, when employed within a slurry which had a temperature of about 220° C. The product was also effective as a hydration catalyst. The product was used in a slurry system for converting 1-hexene to 2-hexanone at a temperature of about 200° C.; and 1,5-hexadiene to 5-hexen-2-ol in a slurry system at a temperature of about 140° C. Similar to the product of Example 1, the product of this Example was also found to be useful as a catalyst for preparing hydrogen peroxide by directly combining hydrogen and oxygen.

EXAMPLE 3

This Example describes a process for preparing silver coated silica shells.

Approximately three liters of de-ionized water was added to a 1-gallon Waring Blender jar, and the pH was increased to about 10.0 by adding NaOH. To this solution was added about 90 g of a stock solution of sodium silicate which had a $SiO_2/Na_2O$ molar ratio of about 3.25, and contained about 28.9 wt % $SiO_2$. About 1350 g of $BaCO_3$ powder (supplied by Kali Chemi), was added to the solution which was blended at high speed for about two minutes to form a slurry. The slurry was transferred to a 18-liter polyethylene beaker, which was agitated and steam heated to about 90° C. in one half hour. The pH of the slurry was 9.82 after reacting.

Next, about 471g of the sodium silicate stock solution (discussed above), was diluted with about 800 ml of water, and added to the continuously agitated slurry over a period of about 4 hours. The pH of the slurry was maintained at about 8.5 by the concurrent addition of hydrochloric acid containing barium chloride which comprised about 125 ml 37% HCl and 9 g $BaCl_2$ that was diluted with 800 ml of water. The resultant slurry contains powders which comprise a barium carbonate core that is coated with silica. The slurry was digested at about 90° C. for about 15 minutes. After digestion, the pH of the slurry was decreased to about 2.0 by adding about 1170 ml. of 37% HCl over a period of about 1 hour, while maintaining the temperature at about 90° C. As a result, the $BaCO_3$ core material was substantially removed, thereby providing a slurry comprising silica shells.

Approximately 250 ml of a solution which contained about 6 g of $SnCl_2.2H_2O$, and 10 ml 37% HCl was added to the above described slurry. The resultant solids or silica shells were separated by filtration, and washed substantially free from chloride ions with de-ionized water.

The silica shells were dispersed into 5 liters of de-ionized water, 2 liters of an aqueous solution which contained about 1025g of $AgNO_3$, and 968 g of $NH_4OH$ was added to the dispersion, which had been heated to a temperature of about 70° C., wherein the dispersion became light brown in color. To the light brown dispersion, about 1,020 g of formaldehyde (30% solution), which was diluted with about 2 liters of water was added, and stirred into the dispersion over a period of about 15 minutes. A black slurry was obtained. The solids from the black slurry were separated by filtration, washed with de-ionized water to substantially remove soluble residues. The washed solids were dried in an air oven at about 110° C., thereby producing about 840 g of a black powder. The resultant powder comprised silica shells which had a coating of 80% silver.

The dry powder resistance of the coated shells was determined and found to be about 10-1 ohms. Such a conductance is sufficient to permit the powder to be employed as an electrical conductor.

EXAMPLE 4

This Example describes a process for preparing palladium coated silica shells which were pre-coated with alumina.

Substantially in accordance with the process of Example 1, approximately 200 g of $CaCO_3$ powder was slurried into one liter of de-ionized water, which had been heated to about 90° C. The pH of the heated slurry was increased to about 9.5 by adding 20% NaOH. Over an approximately two hour period, about 120 g of a $K_2SiO_3$ solution was added to the slurry. The slurry was agitated, and the pH of the slurry was maintained at about 9.5 by adding 20% HCl. The slurry was stirred for about half hour and additional concentrated HCl was added until the pH stabilized at about 2.0. Dry silica shell particulate solids were recovered from the slurry substantially in accordance with the process of Example 1. The recovered silica shells had a nitrogen surface area of about 295 $m^2/g$.

The dry silica shells were slurfled in 1 liter of de-ionized water, which was agitated, heated to about 60° C., and the pH adjusted to about 8.0 by adding 20% NaOH. To the agitated slurry, about 40 cc of an aqueous solution of sodium aluminate, $NaAl(OH)_4$, (supplied by Vinings Corp.), which was equivalent to about 0.385 g $Al_2O_3$/cc, was added over a period of about one and one-half hours, while maintaining the pH at about 8.0 with 20% HCl. The slurry was maintained at a temperature of about 60° C., and the pH at about 8.0 for about half hour. The resultant solids were recovered by filtration, washed with de-ionized water to remove soluble residues which produced a filter cake. A sample of the filter cake, which comprised an alumina containing coating upon a silica shell, was taken, and dried so that the nitrogen surface area could be measured. The surface area of the sample was about 250 $m^2/g$.

Half of the remaining washed cake was slurried into 1 liter of deionized water, heated to a temperature of about 40° C., and the pH was increased to about 10.0 by adding concentrated $NH_4OH$. Approximately 3 grams of $PdNO_3.2H_2O$ were added to the filter cake slurry. After about 10 minutes the Pd salt dissolved, and then about 10 ml of a 35 wt % aqueous solution of hydrazine was added to the slurry. The slurry was agitated and maintained at a temperature about 40° C. for about 30 minutes.

The solids from the slurry were recovered by filtration, washed, and dried in an air oven at a temperature of about 120° C. About 21 g of a product was recovered which contained about 0.75 wt % Pd upon the surface of the alumina coated silica shells. The nitrogen surface area was determined to be about 236 $m^2/g$. The product was examined by X-ray diffraction analysis which showed that the product was composed of amorphous material with a trace of a crystalline component that corresponded to Pd.

The remaining half of the filter cake discussed about was treated similarly to the first half, with the exception that about 16 grams of $PdNO_3.2H_2O$ and about 7 ml. of 35wt% aqueous hydrazine were added. Approximately 26 g of product was obtained which contained about 4 wt % Pd. The nitrogen surface area of the product was about 228 m2/g. The product was examined by X-ray diffraction analysis which indicated the presence of amorphous material and Pd crystallites. The average Pd crystallite size was about 143 angstroms.

The product of this Example was useful as a hydrogenation catalyst for converting cyclododecatriene to cyclododecene.

EXAMPLE 5

This Example describes a process for preparing palladium coated $SiO_2$ shells.

Substantially in accordance with Example 1, about 200 g of $CaCO_3$ powder was slurried in two liters of de-ionized water, heated to a temperature of about 80° C., and the pH was adjusted to about 9.5 by adding 20% NaOH. Approximately 100 g of sodium borate, $Na_2B_4O_7.8H_2O$ was dissolved in about 120 g of a $K_2SiO_3$ solution. Another solution was prepared by dissolving about 2 g of $CaCl_2$ into about 50 ml of deionized water. These two solutions were added concurrently to the $CaCO_3$ slurry over a period of about two hours, while maintaining a temperature of about 80° C., and a pH at of about 9.5 by adding 20% HCl. The resultant slurry contained solids which comprised a coating of silica and boric oxide upon a calcium carbonate core. The slurry was stirred for about half-hour; then about 395 ml of concentrated HCl was added in order to dissolve the $CaCO_3$ core and the $B_2O_3$ component, and the pH stabilized at about 1.0. The product which comprised $SiO_2$ shells was recovered from the slurry by filtration, and washing substantially in the manner described in Example 1, thereby producing a filter cake. A sample was taken from the recovered filter cake, dried and the nitrogen surface area measured as being about 463 $m_2/g$.

The filter cake was reslurried with 1 liter of de-ionized water in a 2 liter beaker, heated to about 40° C. and the pH increased to about 10.0 by adding concentrated $NH_4OH$.

Approximately 15 g of $Pd(NO_3)_2$ was added to the slurry while maintaining the pH at about 6, by adding a sufficient quantity of $NH_4OH$. After about 10 minutes, about 15 ml of a 35 wt % aqueous solution of hydrazine slowly added to the stirred slurry. The slurry was agitated for about 30 minutes at a temperature of about 40° C. and a pH of about 10.0. The resultant slurry became black. The solids from the slurry were recovered by filtration, washed, and dried in an air oven at about 120° C. The dry product yield was about 31 g of a Pd coated silica shell. The coated shells contained about 1.88 wt % Pd. The nitrogen surface area of the coated shells was about 189 m2/g. The shells were examined by X-ray diffraction analysis which indicated the presence of amorphous material and Pd crystallites. The size of the Pd crystallites was about 131 Angstroms.

EXAMPLE 6

This Example describes a process for preparing silica shells which are coated with a mixture of palladium and platinum.

Substantially in accordance with the procedure of Example 1, about 200 g of $CaCO_3$ powder was slurried with 2500 ml of de-ionized water at 80° C. in a 4 liter beaker and the pH was adjusted to 9.5 with 20% NaOH. About 200 ml of a diluted $K_2SiO_3$ solution, which comprised about 200 g of silicate that was diluted to 200 ml with de-ionized water, and; about 10 ml of $CaCl_2$ solution, which comprised about 50 g of chloride that was diluted in 1000 ml of de-ionized water, were both added to the $CaCO_3$ slurry in the manner described above in Example 1. The resultant particles comprised silica coated upon a core of calcium carbonate.

The pH of the slurry was adjusted to about 2.0 by adding concentrated HCl, which dissolved the $CaCO_3$ core, thereby obtaining a slurry of silica shells. About half of this slurry was passed through a vacuum filter, the filtered or recovered solids were washed to remove soluble residues, and the washed solids were slurried in de-ionized water. The pH of the slurry was adjusted to about 7.0 by adding $NH_4OH$.

Approximately 30 g of $Pd(NO_3)_2$ and about 1.4 g of $PtCl_4$ were added to a concentrated solution, which comprised HCl and $HNO_3$, until a generally clear solution was obtained. About half of this solution was added to the silica shell slurry, which was at a temperature of about 50° C., over a period of about 15 minutes. The pH of the slurry was maintained at about 7.0 by adding $NH_4OH$. After about 10 minutes, approximately 0.5 ml of a 35 wt % solution of hydrazine was added to the slurry. The slurry was agitated about 30 minutes.

The resultant slurry became black in color. The solids in the slurry were recovered by filtration, washed, and dried in an air oven at a temperature of about 120° C. The dry product yield was about 22 g.

The dry product comprised silica shells which had a coating that comprised Pd and Pt. Analysis of the product by an Energy dispersible X-Ray procedure confirmed the presence of Si, Pd and Pt.

While certain desirable aspects of the invention have been described above in detail, a person in this art will recognize that a variety of variations and embodiments are encompassed by the appended claims.

The Following Is Claimed:

1. A powder composition in which individual particles of the powder comprise:

a hollow silica shell having a pre-determined shape, an average diameter in the range of about 0.05 to 15 microns, and a shell thickness in the range of from about 5 to 50 nanometers, at least a portion of said silica shell having a coating comprising a surface accessible metal containing species selected from a group consisting of Pd, Pt, Rh, Re, In, Au, Ag, Cu, Ni; wherein said metal containing species comprises about 0.1 to 90% by weight of the powder composition.

2. A powder composition made by the process comprising the steps of:

(a) applying to a slurry comprising core particles, a coating comprising silica, (b) optionally dissolving the cores to form an aqueous slurry comprising hollow silica shells, (c) optionally adding a soluble stannous salt, (d) recovering the silica shells from the slurry, washing and optionally drying the recovered shells;

(e) preparing an aqueous slurry of the recovered silica shells, and;

(f) coating at least a portion of the silica shells with at least one metal containing species, by adding at least one salt of the corresponding metal containing species, and a reducing agent to the slurry.

3. A high surface area and low density catalyst composition made by the process comprising the steps of:

(a) preparing an aqueous slurry comprising hollow silica shells, (b) optionally adding a soluble stannous salt;

(c) applying a coating of at least one catalytic metal upon at least a portion of said shells, by adding at least one salt which corresponds to said metal, and a reducing agent;

(d) recovering the solids from the slurry, and optionally drying the solids.

4. The composition of claims 2 or 3 wherein said metal containing species comprises at least one member selected from the group consisting of Pd, Pt, Rh, Ir Re, In, Au, Ag, Cu, Ni, and alloys thereof.

5. The composition of claim 3 wherein said catalytic metal comprises at least one member selected from the group of Pd and Pt.

6. The composition of claims, 1, 2 or 3 wherein said powder is electrically conductive.

7. The composition of claims 2 or 3, wherein the amount of said metal ranges from about b 0.1 to 90% weight.

8. The composition of claims 2, or 3, further comprising applying an intermediate coating before depositing said metal.

9. The composition of claims 2, or 3, wherein said salt comprises at least one of chlorides and nitrates, and said reducing agent comprises at least one member selected from the group consisting of formaldehyde, hydrazine, alkali metal nitrates, phosphites, and thiosulfates.

10. The composition of claim 1 further comprising an intermediate coating.

* * * * *